(12) United States Patent
Corriveau et al.

(10) Patent No.: US 11,220,834 B1
(45) Date of Patent: Jan. 11, 2022

(54) AWNING SHADE DEVICE WITH REMOVABLE PROJECTOR SCREEN

(71) Applicants: Robert Corriveau, Clermont, FL (US);
Darin Horsley, Clermont, FL (US);
Bobbi Jo Corriveau, Clermont, FL (US); Judy Horsley, Clermont, FL (US)

(72) Inventors: Robert Corriveau, Clermont, FL (US);
Darin Horsley, Clermont, FL (US);
Bobbi Jo Corriveau, Clermont, FL (US); Judy Horsley, Clermont, FL (US)

( * ) Notice: Subject to any disclaimer, the term of this patent is extended or adjusted under 35 U.S.C. 154(b) by 0 days.

(21) Appl. No.: 17/368,294

(22) Filed: Jul. 6, 2021

(51) Int. Cl.
*E04H 15/08* (2006.01)
*G03B 21/58* (2014.01)
*B60P 3/34* (2006.01)

(52) U.S. Cl.
CPC .............. *E04H 15/08* (2013.01); *B60P 3/343* (2013.01); *G03B 21/58* (2013.01)

(58) Field of Classification Search
CPC ........ G03B 21/56; G03B 21/58; E04H 15/08; B60P 3/343; E04F 10/04; E04F 10/0696
See application file for complete search history.

(56) References Cited

U.S. PATENT DOCUMENTS

| 9,036,257 | B2* | 5/2015 | Farmer | G03B 21/58 |
| | | | | 359/443 |
| 10,816,889 | B1* | 10/2020 | Sechrist | E06B 9/62 |
| 2019/0166427 | A1* | 5/2019 | Mathiasen | E04F 10/0666 |
| 2021/0017778 | A1* | 1/2021 | Albert | E04G 21/3276 |
| 2021/0278758 | A1* | 9/2021 | Kalil | G03B 21/58 |

OTHER PUBLICATIONS

Thule Smart Panels Instructions manual Document PNL910-02 // 3380038200 Nov. 2018.*

* cited by examiner

*Primary Examiner* — Christopher E Mahoney
(74) *Attorney, Agent, or Firm* — Jason T. Daniel,Esq.; Daniel Law Offices, P.A.

(57) ABSTRACT

An awning shade device with removable projector screen includes an elongated shade panel that is constructed from a breathable material having sun shading qualities. A plurality of awning attachment devices are disposed along the top end of the panel and function to hang the panel from the roller channel of an awning. A plurality of anchors are disposed along the bottom end of the panel and function to anchor the panel to the ground. A projector screen having an aspect ratio of 4:3 or 16:9, and a matte white front surface is removably secured onto the inside facing surface of the panel or the outside facing surface of the panel in a removable manner by a plurality of connectors and complementary connectors.

11 Claims, 4 Drawing Sheets

AWNING SHADE DEVICE WITH REMOVABLE PROJECTOR SCREEN

TECHNICAL FIELD

The present invention relates generally to recreational vehicle accessories, and more particularly to an awning-mounted sunshade having a removable projector screen.

BACKGROUND

The statements in this section merely provide background information related to the present disclosure and may not constitute prior art.

It is common for modern recreational vehicles (RV) such as trailers, campers, and motor homes to be fitted with an awning assembly that can be deployed when the RV is parked to provide shade and rain protection for an area adjacent to the parked RV. To this end, such awnings can be retracted and stowed against the side of the RV when not in use, such as when the RV is in transit.

Although such assemblies are extremely popular, they are only able to provide shade when the awning fabric is located between the sun and the area to be shaded. If the sun is relatively low in the sky, there can be a problem with the awning not providing suitable shade. In either instance, awning assemblies as described above enhance RV owners' enjoyment of their RVs by allowing them to sit outside and be shaded from direct sunlight and/or to sit in dry comfort during rain showers.

During such times, many individuals look for some type of entertainment. For example, some modern RVs are constructed to include elaborate outdoor televisions and other forms of audiovisual devices that can be utilized while beneath the awning. Although useful, many RVs are not equipped with such systems.

In a separate field of endeavor, there are many known types of portable movie screen devices, such as inflatable movie screens, for example, that are designed to be used outdoors with a portable video projection system. Although useful in calm weather for outdoor viewing, these systems are not suitable for use in bad weather conditions, such as when it is raining. Moreover, such systems are often difficult to setup, anchor to the ground, and have a tendency to occupy a large amount of space when not in use.

Accordingly, it would be beneficial to provide an awning-mounted sunshade panel having a removable projector screen so as to overcome the drawbacks described above.

SUMMARY OF THE INVENTION

The present invention is directed to an awning shade device with removable projector screen. One embodiment of the present invention can include an elongated shade panel that is constructed from a breathable material having sun shading qualities. A plurality of awning attachment devices can be disposed along the top end of the panel and can function to hang the panel from the roller channel of an awning. A plurality of anchors can be disposed along the bottom end of the panel and can function to anchor the panel to the ground.

One embodiment of the present invention also includes a projector screen having an aspect ratio of 4:3 or 16:9. The screen can include a matte white front surface for diffusing ambient light, and a dark back surface for blocking light.

In one embodiment, a plurality of connectors can be disposed along the panel, and a plurality of adjustable complementary connectors can be disposed along the screen. Each of the connectors and complementary connectors being configured to secure the screen onto the inside facing surface or the outside facing surface of the panel in a removable manner.

This summary is provided merely to introduce certain concepts and not to identify key or essential features of the claimed subject matter.

BRIEF DESCRIPTION OF THE DRAWINGS

Presently preferred embodiments are shown in the drawings. It should be appreciated, however, that the invention is not limited to the precise arrangements and instrumentalities shown.

DETAILED DESCRIPTION OF THE INVENTION

Figure 1:
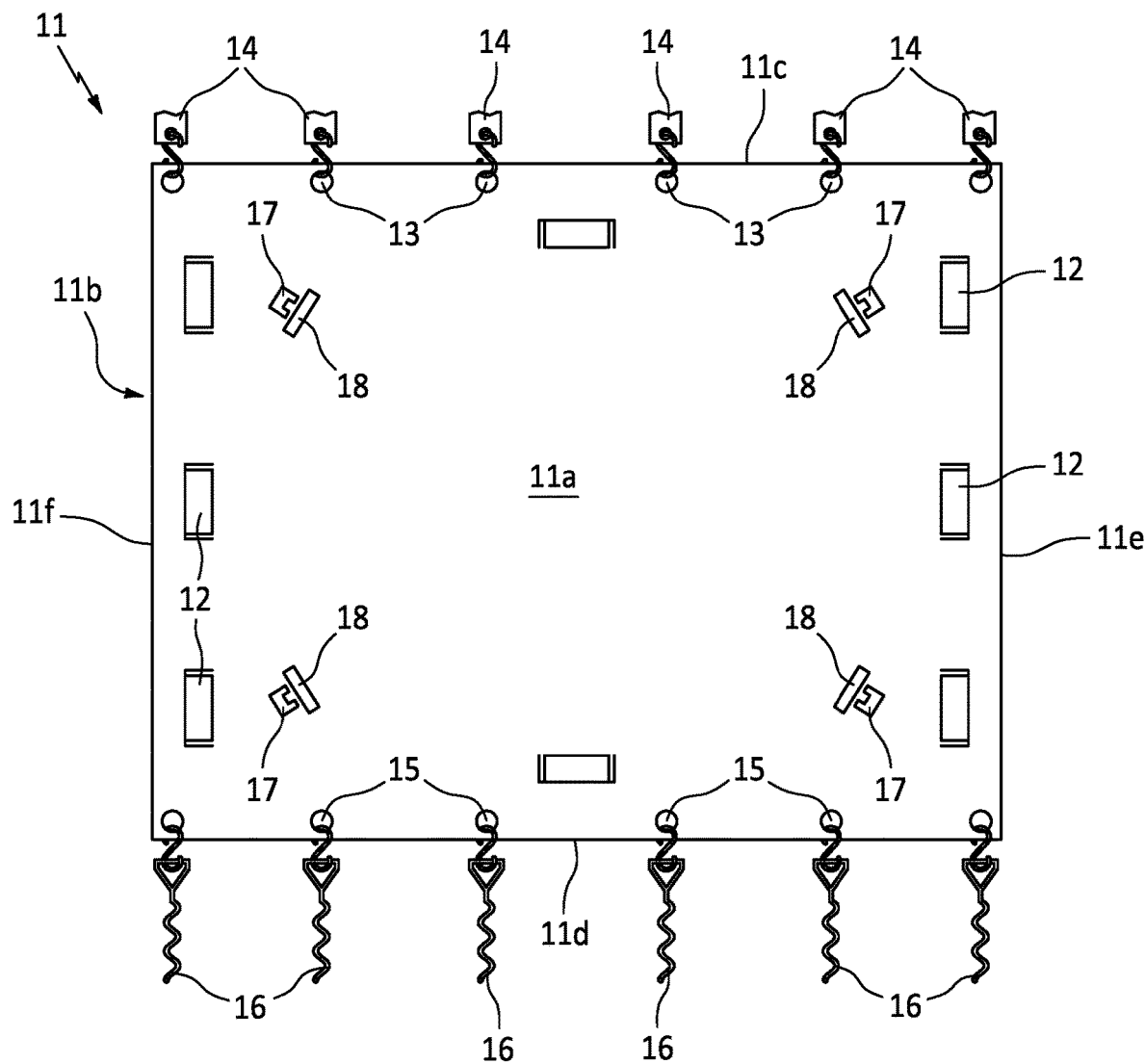
FIG. 1 is a front view of the sunshade panel of the awning shade device with removable projector screen, in accordance with one embodiment of the invention.

While the specification concludes with claims defining the features of the invention that are regarded as novel, it is believed that the invention will be better understood from a consideration of the description in conjunction with the drawings. As required, detailed embodiments of the present invention are disclosed herein; however, it is to be understood that the disclosed embodiments are merely exemplary of the invention which can be embodied in various forms. Therefore, specific structural and functional details disclosed herein are not to be interpreted as limiting, but merely as a basis for the claims and as a representative basis for teaching one skilled in the art to variously employ the inventive arrangements in virtually any appropriately detailed structure. Further, the terms and phrases used herein are not intended to be limiting but rather to provide an understandable description of the invention.

Definitions

As described herein, a "unit" means a series of identified physical components which are linked together and/or function together to perform a specified function.

As described throughout this document, the term "about" "approximately" "substantially" and "generally" shall be used interchangeably to describe a feature, shape or measurement of a component within a tolerance such as, for example, manufacturing tolerances, measurement tolerances or the like.

As described herein, the term "removably secured," and derivatives thereof shall be used to describe a situation wherein two or more objects are joined together in a non-permanent manner so as to allow the same objects to be repeatedly joined and separated.

As described throughout this document, the term "complementary shape," and "complementary dimension," shall be used to describe a shape and size of a component that is identical to, or substantially identical to the shape and size of another identified component within a tolerance such as, for example, manufacturing tolerances, measurement tolerances or the like.

As described herein, the terms "connector" and "complementary connector" are used to describe two components that work together to repeatedly join two items together in a nonpermanent manner. Several nonlimiting examples include opposing strips of hook and loop material (i.e., Velcro®), attractively-oriented magnetic elements, flexible strips of interlocking projections with a slider (i.e., zipper), a thin, flexible strap with a notched surface and one end threaded through a locking mechanism (i.e., zip tie) at the other, tethers, buckles such as side release buckles, and compression fittings such as T-handle rubber draw latches, hooks, snaps and buttons, for example. Each illustrated connector and complementary connector can be permanently secured to the illustrated portion of the device via a permanent sealer such as glue, adhesive tape, or stitching, for example.

FIGS. 1-4 illustrate one embodiment of an awning shade device with removable projector screen 10 that are useful for understanding the inventive concepts disclosed herein. In each of the drawings, identical reference numerals are used for like elements of the invention or elements of like function. For the sake of clarity, only those reference numerals are shown in the individual figures which are necessary for the description of the respective figure. For purposes of this description, the terms "upper," "bottom," "right," "left," "front," "vertical," "horizontal," and derivatives thereof shall relate to the invention as oriented in FIG. 3.

As shown and described below, various embodiments of the device 10 can include a sunshade panel 11 that can be secured to any type of awning assembly. The device can also include a projector screen 20 that can be removably secured along an inside or outside facing surface of the panel 11 to allow all-weather use and operation of the device.

Although illustrated with regard to an RV awning, the inventive concepts are not so limiting, as the device can be used with any type of awning structure. Additionally, although described as a removable projector screen, this is also for illustrative purposes. To this end, other embodiments are contemplated wherein the projector screen is permanently secured onto one or both sides of the panel so as to be non-removable in nature.

As shown in FIG. 1, one embodiment of the sunshade panel 11 can include a substantially rectangular shaped member having an inside facing surface 11a, an outside facing surface 11b, a top end 11c, a bottom end 11d, and a pair of sides 11e and 11f. In the preferred embodiment, the shade panel 11 can be constructed from a single piece of woven polyester with a durable vinyl coating, so as to block harmful UVA and UVB rays from the sun. In various embodiments, the shade panel can be constructed so as to be breathable and generally see-through, or to be waterproof and opaque in accordance with known manufacturing techniques.

Although described above with regard to a rectangular shape and having a particular construction material, this is for illustrative purposes only. To this end, the panel 11 may be manufactured to include any number of different shapes and can include any number of different widths (e.g., distance between sides 11e and 11f) and heights (e.g., distance between top end 11c and bottom end 11d), so as to be compatible for use with any type of RV or building mounted awning system. To this end, specific devices may be manufactured so as to include a width that is complementary to the width of the awning to which the device is to be attached.

In one embodiment, a plurality of wind flaps 12 can be disposed along the panel 11. Each of the flaps functioning to allow wind to pass through the awning in order to reduce the structural load on the below described connection devices in the event of a high wind situation.

In one embodiment, a first plurality of holes 13 can be disposed along the top end 11c of the panel. Each of the holes can function to receive an awning hook 14 which can slidingly engage the roller bar channel of a retractable awning in order to suspend the panel 11 therefrom.

One example of a suitable awning hook includes the model 42693 universal awning hook that is commercially available by Camco, Inc. Of course, other embodiments are contemplated wherein different awning hooks are utilized and/or wherein the awning hooks are permanently connected to the top end of the panel 11.

In one embodiment, a second plurality of holes 15 can be disposed along the bottom end 11d of the panel. Each of the holes can function to receive a ground anchor 16 which can secure the bottom end of the panel to the ground. One example of a suitable awning anchor includes the model 901001 corkscrew awning anchor that is commercially available by Carefree of Colorado, Inc. Of course, any number of other types of ground anchors are also contemplated.

In one embodiment, a plurality of connectors 17 can be disposed along the panel 11. Each of the connectors 17 being configured to receive and engage a complementary connector 23 of the below described removable screen 20. In the preferred embodiment, each of the connector and complementary connectors will comprise a side quick release buckle, so as to permit a user to quickly and easily fasten the screen 20 onto the panel 11.

In one embodiment, the connectors 17 can be positioned along the inside facing surface 11a, at a location adjacent to an elongated aperture 18. Such a feature allows a single set of connectors to accommodate placement of the screen 20 on the inside facing surface 11a, or the outside facing surface 11b by passing the elongated strap 22 and complementary connector 23 through the aperture 18.

Of course, other embodiments are contemplated wherein different types of connectors and complementary connectors are utilized. Moreover, such connectors and complementary connectors may be positioned anywhere along either the panel 11 or the screen 20.

Figure 2:
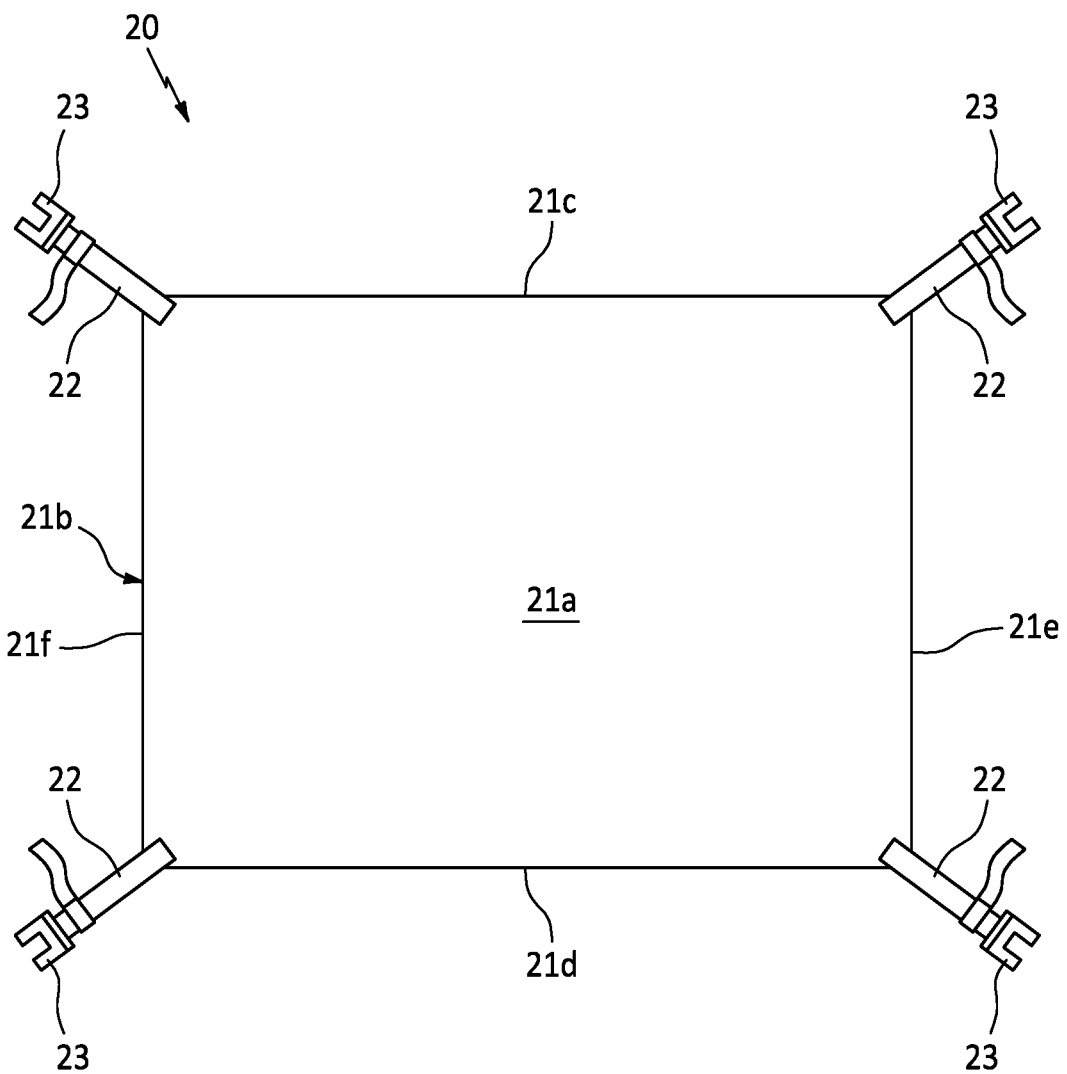
FIG. 2 is a front view of the projector screen of the awning shade device with removable projector screen, in accordance with one embodiment of the invention.

FIG. 2 illustrates one embodiment of the removable projector screen 20. As shown, the screen 20 will preferably include a rectangular shape having a front surface 21a, a rear surface 21b, a top end 21c, a bottom end 21d, and a pair of sides 21e and 21f. In the preferred embodiment, the screen 20 will form a 4:3 or 16:9 aspect ratio so as to conform to standard image sizes for virtually all video projection systems.

In either instance, the screen 20 will preferably be constructed from PVC fabric having a matte white front surface 21a for diffusing light in all directions and having a black rear surface 21b that eliminates light penetration from the back end. In the preferred embodiment, the screen will have a gain factor of 1.0, however other factors are also contemplated.

As shown, a plurality of adjustable straps 22 can extend outward from each corner of the screen 20, and a complementary connector 23 can be disposed along the distal end of each strap. As noted above, complementary connectors 23 can engage connectors 17 to secure the screen to the front or back side of the panel 11. Moreover, the straps can be selectively loosened and tightened to adjust the orientation of the screen 20 on the panel during use.

Figure 3:
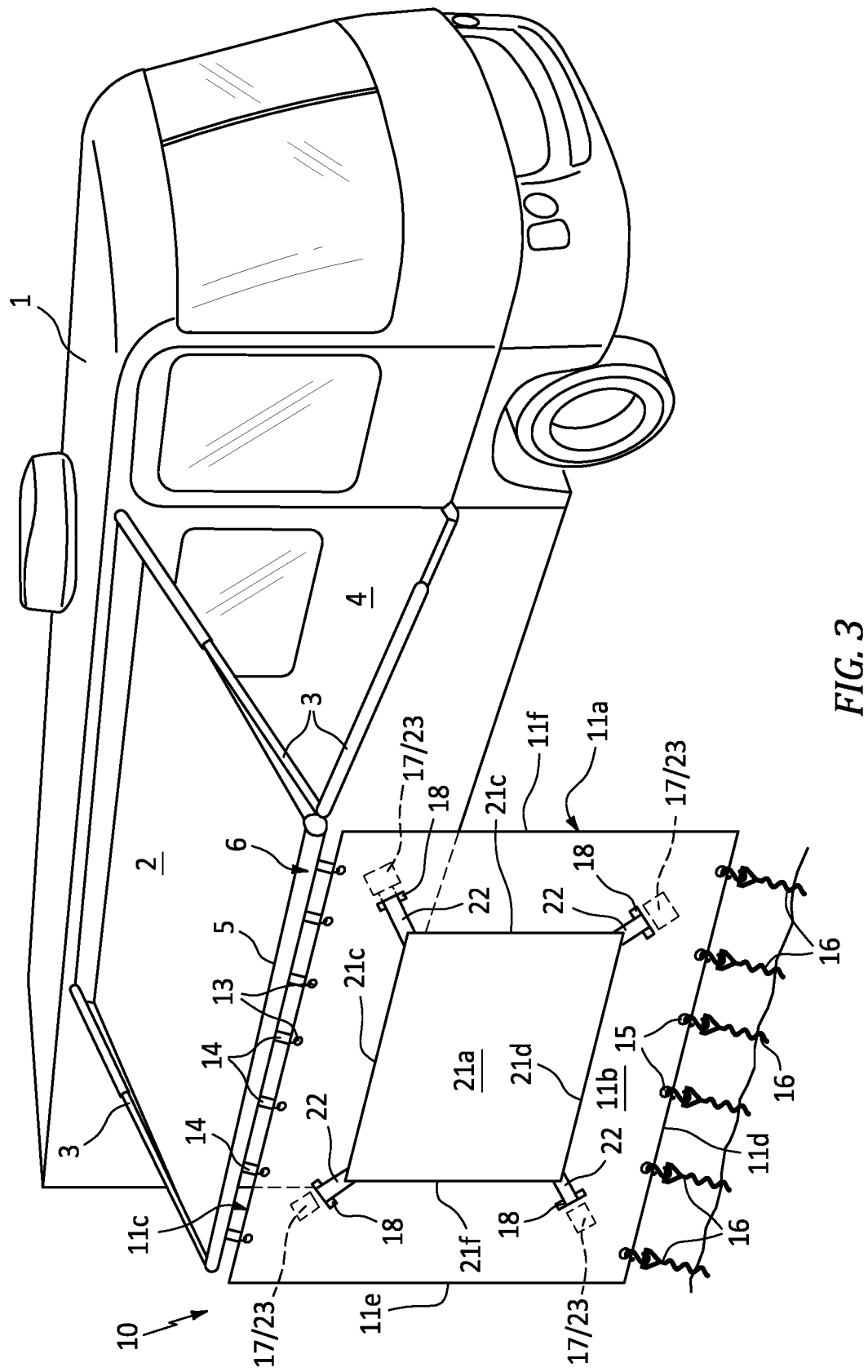
FIG. 3 is a perspective view of the awning shade device with removable projector screen in operation, in accordance with one embodiment of the invention.
Figure 4:
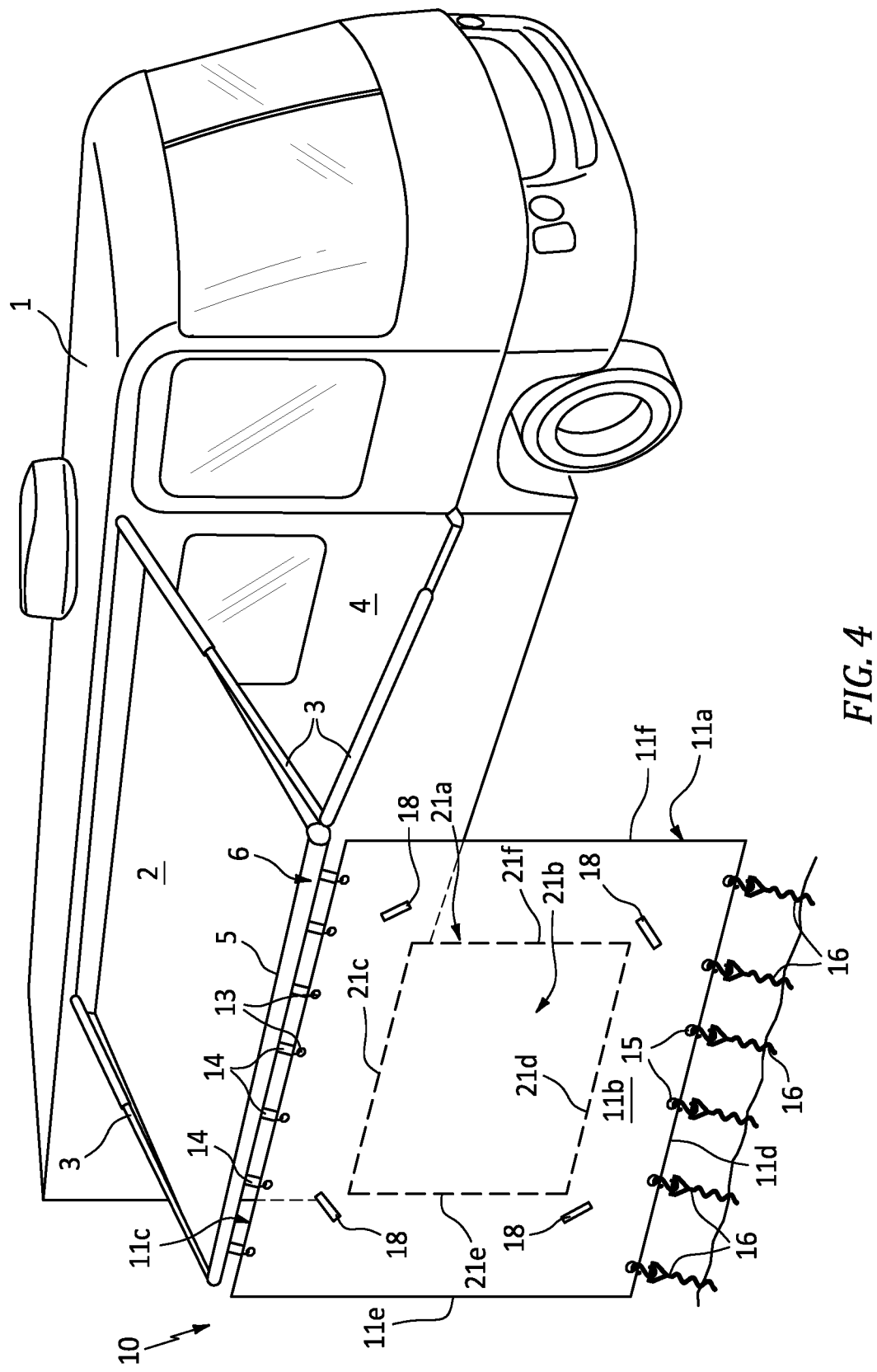
FIG. 4 is another perspective view of the awning shade device with removable projector screen in operation, in accordance with one embodiment of the invention.

FIGS. 3 and 4 illustrate one embodiment of the device 10 in operation with the retractable awning assembly of an RV 1. As shown, the awning assembly typically includes a canopy 2 having a plurality of support arms 3 that are connected to the sidewall 4 of the vehicle. A roller assembly 5 having the above-described roller bar channel 6 is positioned along the distal ends of the support arms and functions to selectively roll and unroll the canopy 2.

To this end, the device 10 can be secured to the awning assembly by first sliding the awning hooks 14 into the roller bar channel 6 to suspend the panel 11 from the roller assembly. Next, the ground anchors 16 can be secured into the ground, and the screen 20 can be connected to the panel 11 via the connectors 17/23.

As shown at FIG. 3, the screen can be positioned with the front end 21a along the outside facing surface 11b of the panel 11 to permit viewing the screen from a location not under the canopy assembly. Such a feature advantageously allowing many individuals to view the contents of the screen as may be useful in good weather situations. In such a configuration, the straps 22 will be routed through the apertures 18 to allow complementary connectors 17 to engage connectors 23.

As shown at FIG. 4, the screen can also be positioned along the inside facing surface 11b of the panel 11. Such a feature advantageously allowing individuals to view the screen 21a while lounging beneath the canopy assembly and enjoying the shade and rain protection offered by the same. Such a feature being particularly beneficial in bad weather situations where a traditional inflatable screen or other such devices could not be constructed.

Although described above with regard to using the screen 20 along the front or back sides of the panel 11, other embodiments are also contemplated. For example, one embodiment of the inventive concepts can include a plurality of secondary connectors which can function to removably secure the screen 20 to any number of external objects, such as the wall of a building or the sidewall of an RV, for example.

In one embodiment, each of the secondary connectors can include first end having an attachment member such as a hook, or suction cup, for example, and a second end having the complementary connector 23 described above. In this regard, the first end can engage the external object and the second end can engage the screen 20. Such a feature advantageously allows device components to be used together or separately to increase the overall functionality of the device 10.

As described herein, one or more elements of the awning shade device with removable projector screen 10 can be secured together utilizing any number of known attachment means such as, for example, glue, seam tape, stitching and the like. Moreover, although the above embodiments have been described as including separate individual elements, the inventive concepts disclosed herein are not so limiting. To this end, one of skill in the art will recognize that one or more individually identified elements may be formed together as one or more continuous elements, either through manufacturing processes, such as welding, casting, or molding, or through the use of a singular piece of material milled or machined with the aforementioned components forming identifiable sections thereof.

As to a further description of the manner and use of the present invention, the same should be apparent from the above description. Accordingly, no further discussion relating to the manner of usage and operation will be provided.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Likewise, the term "consisting" shall be used to describe only those components identified. In each instance where a device comprises certain elements, it will inherently consist of each of those identified elements as well.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention claimed is:

1. An awning shade device, comprising:
    a see-through panel having an inside facing surface, an outside facing surface, a top end and a bottom end;
    at least one awning attachment device that is configured to secure the top end of the panel to an awning;
    a plurality of connectors that are disposed along the panel;
    a projector screen having a front surface and a rear surface; and
    a plurality of complementary connectors that are positioned along the projector screen,
    wherein each of the plurality of connectors and plurality of complementary connectors are configured to removably secure the projector screen onto the panel.

2. The device of claim 1, wherein each of the at least one awning attachment device includes functionality for slidingly engaging a roller bar channel of the awning.

3. The device of claim 1, wherein the projector screen is constructed from PVC fabric.

4. The device of claim 1, wherein the projector screen includes a rectangular shape.

5. The device of claim 4, wherein the rectangular shape defines a 4:3 aspect ratio.

6. The device of claim 4, wherein the rectangular shape defines a 16:9 aspect ratio.

7. The device of claim 1, wherein the front surface of the projector screen includes a matte white color that is configured to diffuse light.

8. The device of claim 1, wherein the back surface of the projector screen includes a black color that is configured to eliminate light from illuminating the front surface.

9. The device of claim 1, wherein the projector screen comprises a gain factor of 1.0.

10. The device of claim 1, further comprising:
   a plurality of anchors that are configured to secure the bottom end of the panel to the ground.

11. The device of claim 1, wherein the panel is constructed from woven polyester having a vinyl coating that is configured to block UVA and UVB rays from the sun.

\* \* \* \* \*